US012059712B2

(12) United States Patent
Dubrulle et al.

(10) Patent No.: US 12,059,712 B2
(45) Date of Patent: Aug. 13, 2024

(54) SORTING DEVICE FOR AGRICULTURAL PRODUCTS AND CORRESPONDING METHOD

(71) Applicants: ETS DUBRULLE, Sainte Marie Cappel (FR); BILBERRY SAS, Gentilly (FR)

(72) Inventors: Damien Dubrulle, Cassel (FR); Hugo Serrat, Gentilly (FR); Thomas Deschodt, Sainte Marie Cappel (FR); Guillaume Jourdain, Gentilly (FR); Duc-Anh Luu, Gentilly (FR)

(73) Assignees: ETS DUBRULLE, Sainte Marie Cappel (FR); BILBERRY SAS, Gentilly (FR)

( * ) Notice: Subject to any disclaimer, the term of this patent is extended or adjusted under 35 U.S.C. 154(b) by 0 days.

(21) Appl. No.: 17/633,324

(22) PCT Filed: Jun. 25, 2020

(86) PCT No.: PCT/EP2020/067796
§ 371 (c)(1),
(2) Date: Feb. 7, 2022

(87) PCT Pub. No.: WO2021/037417
PCT Pub. Date: Mar. 4, 2021

(65) Prior Publication Data

US 2022/0379348 A1 Dec. 1, 2022

(30) Foreign Application Priority Data

Aug. 30, 2019 (FR) ....................................... 1909571

(51) Int. Cl.
*B07C 5/342* (2006.01)
*B07C 5/36* (2006.01)

(52) U.S. Cl.
CPC ................ *B07C 5/342* (2013.01); *B07C 5/36* (2013.01); *B07C 2501/0081* (2013.01)

(58) Field of Classification Search
CPC ... B07C 5/36; B07C 5/342; B07C 2501/0081; B07C 2501/009
See application file for complete search history.

(56) References Cited

U.S. PATENT DOCUMENTS 4,308,959 A 1/1982 Hoover et al.
4,348,277 A * 9/1982 Cowlin .................... B07C 5/36 209/939

(Continued)

FOREIGN PATENT DOCUMENTS

EP 2411164 B1 4/2015
WO 2005061130 A1 7/2005

OTHER PUBLICATIONS

Herbert Engineering. "Herbert Engineering—Oculus—Optical Sorting—New 2014" Accessed on Apr. 18, 2023. https://www.youtube.com/watch?v=yo_GGUyNAa4 (Year: 2014).*

(Continued)

*Primary Examiner* — Michael McCullough
*Assistant Examiner* — Jessica L Burkman
(74) *Attorney, Agent, or Firm* — Perilla Knox & Hildebrandt LLP; Stephanie L. Davy-Jow

(57) ABSTRACT

A sorting device for sorting agricultural products coming from a bulk flow and a corresponding method are described. A sorting device includes an image acquisition unit; an image processing unit configured to identify and analyze each product in the bulk flow; a decision unit configured to determine the products to be separated; a separation unit arranged to separate at least some of the products coming from the bulk flow; and a unit for conveying the agricultural products in the form of bulk flow. The sorting device may further include means for turning over the agricultural (Continued)

products on themselves, mounted in the conveying unit facing the image acquisition unit, and configured to allow an exposure to the image acquisition unit, of the different parts of the conveyed agricultural products.

20 Claims, 2 Drawing Sheets

(56) References Cited

U.S. PATENT DOCUMENTS

| | | | | |
|---|---|---|---|---|
| 5,244,100 | A * | 9/1993 | Regier | B07C 5/36 209/939 |
| 7,607,544 | B2 | 10/2009 | Petersen et al. | |
| 8,816,235 | B2 * | 8/2014 | Soler Esteban | B07C 5/366 209/579 |
| 9,114,436 | B2 | 8/2015 | Berghmans et al. | |
| 2007/0144946 | A1 | 6/2007 | Petersen et al. | |
| 2012/0021101 | A1 | 1/2012 | Berghmans et al. | |
| 2017/0121122 | A1 * | 5/2017 | Blanc | B65G 47/248 |

OTHER PUBLICATIONS

Notice of Opposition Filed at French Patent Office on Jun. 16, 2022 for French Patent No. FR 3 100 140 B1.
Video: "Herbert Engineering—Oculus—Optical Sorting—New 2014," YouTube, https://www.youtube.com/watch?v=yo_GGUyNAa4 (Alleged Publication: Feb. 12, 2014).
Video: "Miedema Smart Solutions met Smart Grader," YouTube, https://www.youtube.com/watch?v=y5fx7QHBZXk (Alleged Publication: Feb. 5, 2013).
Brochure: "Herbert Oculus," Herbert Solutions (Alleged Publication: Jan. 2, 2018).
Screenshot: Properties of the "Herbert Oculus" Brochure PDF File with Alleged Creation Date of Jan. 2, 2018.
Screenshot: Internet URL to Access the "Herbert Oculus" Brochure PDF File, allegedly dated Oct. 2017, and Internet Link to the "Herbert Engineering—Oculus" Video of Feb. 12, 2014.
LandbouwMechanisatie Review, "Miedema Smart Grader SG 400," Alleged Publication: Dec. 2014.
Noordam, Jacco & Otten, Gerwoud & Timmermans, A.J.M. & Zwol,. (2000). High-speed potato grading and quality inspection based on a color vision system. Paper read at Machine vision and its applications, Jan. 24-26, at San Jose (USA). 3966. 10.1117/12.380075.
Dhulipalla, R., Verma, R.C., Agrawal, N.K., & Jain, N. (2018). Visible Image Processing for Feature Identification and Classification of Agricultural Products—A Critical Review Report. International Journal of Technical Research & Science.
Screenshot: Screenshot of a web page showing that the "High-speed potato grading and quality inspection based on a color vision system" publication allegedly took place Mar. 21, 2000.
Lopez, J.J., Cobos, M. & Aguilera, E. Computer-based detection and classification of flaws in citrus fruits. Neural Comput & Applic 20, 975-981 (2011). https://doi.org/10.1007/s00521-010-0396-2.
International Search Report for International Application No. PCT/EP2020/067796 mailed Sep. 22, 2020.
Written Opinion for International Application No. PCT/EP2020/067796 mailed Mar. 4, 2021.
Third Party Observation for International Application No. PCT/EP2020/067796 mailed Jan. 4, 2022.
Herbert Solutions, "Oculus Intelligent Optical Sorting," https://www.herbertsolutions.com/wp-content/uploads/2017/10/Herbert_Brochure-Oculus-Potatos.pdf (Oct. 2017) (Last visited: Feb. 7, 2022).
WUR eDepot, "Miedema Smart Grader SG 400," https://edepot.wur.nl/324621 (Dec. 2014) (Last visited: Feb. 7, 2022).
Noordam et al., "High-speed Potato Grading and Quality Inspection based on a Color Vision System," Proc. SPIE 3966, Machine Vision Applications in Industrial Inspection VIII, (Mar. 21, 2000); https://doi.org/10.1117/12.380075.

* cited by examiner

[Fig. 1]
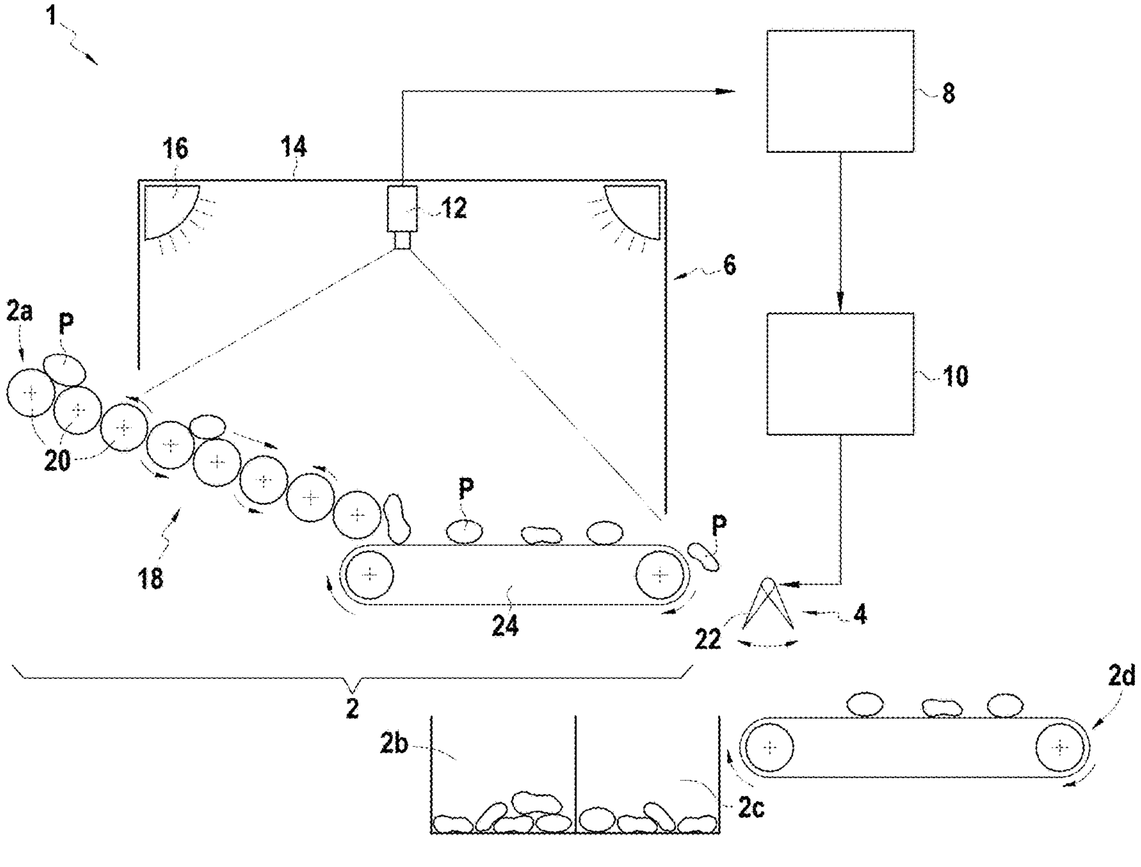

[Fig. 2]
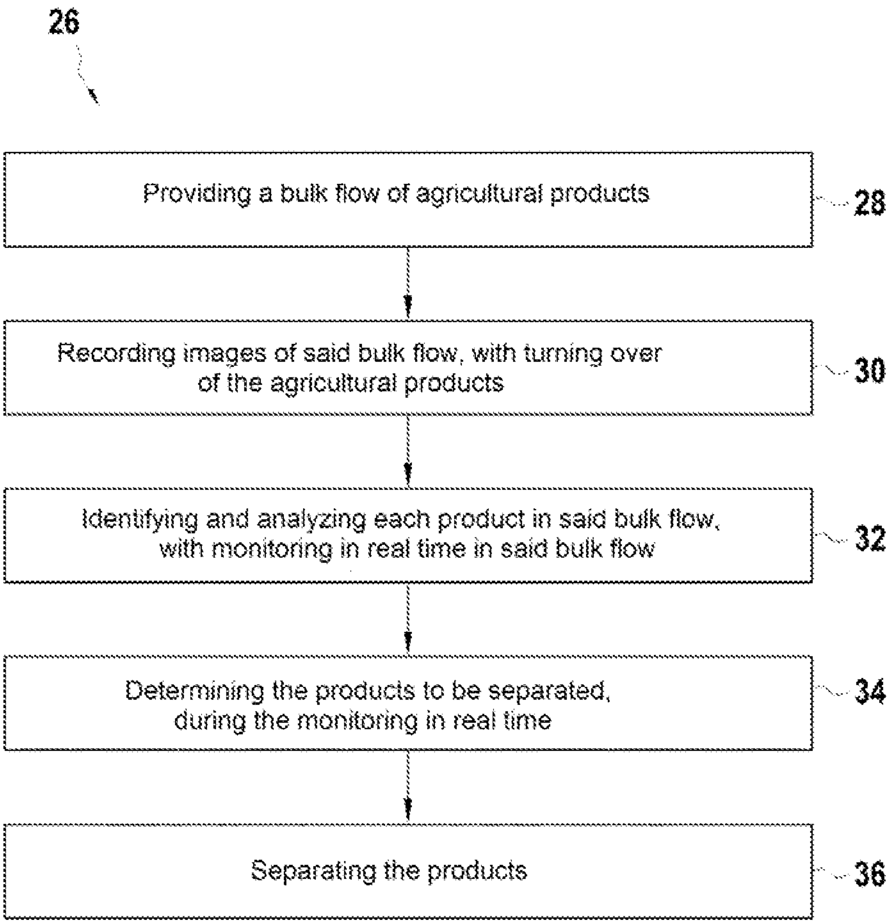

SORTING DEVICE FOR AGRICULTURAL PRODUCTS AND CORRESPONDING METHOD

CROSS-REFERENCE TO RELATED APPLICATIONS

This application is a national phase under 35 U.S.C. § 371 of International Application No. PCT/EP2020/067796 filed Jun. 25, 2020, which claims the benefit of and priority to French Patent Application No. 1909571 filed Aug. 30, 2019, the contents of both of which being incorporated by reference in their entireties herein.

TECHNICAL FIELD

The present disclosure relates to the field of agricultural machines and, more particularly to the field of machines for sorting bulbs, such as potatoes, onions, carrots, etc.

BACKGROUND

It is known to use sorting machines in the agricultural field for processing a bulk flow of agricultural products such as bulbs.

Thus, it is known to sort a bulk flow of potatoes in order to remove foreign bodies therefrom, in particular clods of earth or stones. To this end, it is known to use infrared cameras or ultraviolet lighting to differentiate the clods of earth and stones from the potatoes.

Once the clods of earth or stones have been identified by the infrared cameras or ultraviolet lighting, the device includes a finger separation means that allows conveying said clods of earth or stones to the waste.

Such a device is in particular described in patent EP 2 411 164 B1.

Such a device is particularly effective and allows automatically making a first sorting between the potatoes and the foreign bodies harvested at the same time as the potatoes.

However, such a sorting device does not allow sorting the bulbs together because they are considered as identical when they are analyzed by an infrared camera or illuminated by ultraviolet radiation. The sorting of the bulbs together can thus only be made by hand, which involves high processing time and cost.

BRIEF SUMMARY

The present disclosure aims to solve the different technical problems set out above. Particularly, the present invention aims to propose a machine for sorting agricultural products, in particular bulbs, according to different criteria, in particular based on the external appearance of the agricultural product. More specifically, the present invention aims to propose a sorting machine that allows making a precise and adaptable selection.

Thus, according to one aspect, a sorting device is proposed for sorting agricultural products, for example bulbs and more particularly potatoes, carrots or onions, coming from a bulk flow, comprising:

- an image acquisition unit configured to record images of said bulk flow,
- an image processing unit receiving as inputs the images recorded by said image acquisition unit, said image processing unit being configured to identify each product and analyze in particular the visual appearance of the products in said bulk flow from said recorded images,
- a decision unit connected to said image processing unit and configured to determine, from the visual appearance of the products, the products to be separated and to provide a corresponding control signal,
- a separation unit receiving as input the control signal and arranged to separate at least some of said products coming from the bulk flow according to the control signal, and
- a unit for conveying the agricultural products in the form of bulk flow, from the image acquisition unit to the separation unit.

Particularly, the sorting device also includes a means for turning over the agricultural products on themselves, mounted in the conveying unit facing the image acquisition unit, and configured to allow an exposure to the image acquisition unit, of the different parts of the conveyed agricultural products.

Thus, the sorting device according to the present disclosure is configured to allow a sorting of the products according to their visual appearance, by providing a means for turning over the products in the field of the image acquisition unit, in order to allow the external analysis of the products and thus be able to categorize them according to determined criteria.

Optionally, the processing unit is also configured to monitor, in particular in real time, each product on the conveying unit, in said bulk flow, including during its turning over on the turning means.

As the device has to perform the analysis of the images provided by the image acquisition unit before being able to send the control signal to the separation unit, and the analysis of the images may require some time, real-time monitoring of the products is provided in order to know their location during the analysis time. This allows in particular being able to sort them correctly upon their passage in the separation unit.

Optionally, the conveying unit also comprises an intermediate portion disposed downstream of the turning means, and conveying the agricultural products to the separation unit.

The intermediate portion is provided to leave time for the processing unit in order to analyze the images provided by the image acquisition unit. The intermediate portion can thus be provided to allow the real-time monitoring of the products conveyed therein, or can be configured to convey the products while maintaining, at the exit, their respective entry positioning.

Optionally, the intermediate portion is configured to maintain the relative position of the agricultural products in the bulk flow during their conveying through the intermediate portion to the separation unit.

In this case, it is no longer necessary to perform real-time monitoring in the intermediate portion: it is sufficient to know the positioning of the different products at the inlet of the intermediate portion and to know the duration of conveying of the products through the intermediate portion, in order to be able to correctly sort the products at the outlet of the intermediate portion.

Optionally, the intermediate portion is also positioned facing the acquisition unit.

In this case, the real-time monitoring of the products using the images provided by the acquisition unit can continue during the conveying of the products through the intermediate portion.

Optionally, the acquisition unit includes at least one camera, and optionally: at least one light source, mounted above, optionally in line with, a portion of the conveying unit, and a casing covering said at least one camera, said at least one light source, and said portion of the conveying unit.

The acquisition unit is configured to allow an image capture for subsequent processing by the processing unit. To this end, the acquisition unit includes elements that allow obtaining the same capture conditions, in particular regardless of the external conditions in particular sunlight conditions. Thus, a casing and at least one light source are intended to provide uniform and constant lighting conditions on the products to be sorted.

Optionally, the separation unit includes fingers, optionally uniformly distributed over the width of the conveying unit, each having a deployed position to deflect the path of an agricultural product, and a retracted position to allow the passage of the agricultural products.

Such a separation unit is known and allows performing a rapid and effective separation of the different products, in particular when they fall between two conveying levels.

Optionally, the separation unit is also configured to position one or several fingers from the retracted position to the deployed position during or before the passage of the agricultural product facing said finger(s), so as to deflect the path of the agricultural product with or without impetus.

In order to allow a sorting into at least three categories, the fingers of the separation unit according to the disclosure are configured either to deflect the products from their path towards a first sorting area, or to hit the products towards a second sorting area. Thus, with the same separation unit but with a command of the moment of deployment of the fingers, it is then possible to perform a sorting into at least three categories with fingers having only two (retracted and deployed) positions.

Optionally, the acquisition unit is configured to record several images per second, optionally more than 5 and, optionally, more than 10.

A high recording frequency of the acquisition unit allows better capture of the different products as well as better real-time monitoring during the image processing phase.

Optionally, the processing unit comprises a convolutional neural network.

The convolutional neural network allows the processing of the images and the sorting of the products from a learning phase: by providing the processing unit beforehand with examples of products corresponding to predefined criteria, the neural network can then perform the sorting of the products proposed thereto based on the criteria recorded during the learning phase. Such a convolutional neural network therefore allows a sorting according to multiple and varied criteria that only require prior learning.

According to another aspect, a sorting method is also proposed for sorting agricultural products, for example bulbs and more particularly potatoes, carrots or onions, coming from a bulk flow. The method comprises:

- an image acquisition step during which images of said bulk flow are recorded,
- an image processing step receiving as inputs the recorded images, and during which each product is identified and analyzed, in particular the visual appearance, in said bulk flow,
- a decision step during which, from the visual appearance of the products, the products to be separated are determined,
- a separation step during which at least some of said products coming from the bulk flow are separated, and
- a step of conveying the agricultural products in the form of bulk flow.

Particularly, the sorting method also includes a step of turning over the agricultural products on themselves, during the image acquisition step, to allow an exposure of the different parts of the conveyed agricultural products.

While maintaining the relative position of the agricultural products in the bulk flow, the agricultural products are conveyed from the turning means to the separation unit.

BRIEF DESCRIPTION OF THE DRAWINGS

FIG. 1 represents a schematic view of the agricultural product sorting device according to various embodiments of the present disclosure; and FIG. 2 illustrates the different successive stages of implementation of the sorting method by the sorting device illustrated in FIG. 1.

DETAILED DESCRIPTION

In FIG. 1 schematically represents a sorting device 1 according to the present disclosure. The sorting device 1 is intended to sort agricultural products, such as bulbs, and more particularly to sort potatoes. The sorting device 1 allows in particular sorting the agricultural products according to external criteria of appearance, shape and/or color.

The sorting device 1 thus includes a conveying unit 2 and a separation unit 4.

The conveying unit 2 allows conveying the bulk flow of agricultural products, in this case potatoes P, from a supply point 2*a* to several outlets 2*b*, 2*c*, 2*d* between which the potatoes P are sorted by the separation unit 4.

In order to allow the separation unit 4 to perform the sorting of the potatoes P, the sorting device 1 also comprises an acquisition unit 6, an image processing unit 8 and a decision unit 10.

The acquisition unit 6 is intended to capture images of the potatoes P during their travel on the conveying unit 2, and more particularly of the external visual appearance of the potatoes P. To this end, the acquisition unit 6 includes at least one camera 12 positioned facing at least a portion of the conveying unit 2 in order to be able to take a photo of or film the potatoes P driven by the conveying unit 2.

Furthermore, and in order to obtain uniform and comparable images of the potatoes P, whatever the external brightness of the sorting device 1, the acquisition unit also comprises a casing 14. The casing 14 covers the portion of the conveying unit 2 located in the field of the camera 12, and thus allows blocking the light outside the field of the camera 12. The acquisition unit also includes light sources 16 mounted inside the casing 14 and making it possible to create, in the field of the camera 12, a uniform and constant lighting of the potatoes P.

To allow the complete analysis of the potatoes P, and more particularly the analysis of the different sides of the potatoes P, the conveying unit 2 comprises, at least partly in the portion located in the field of the camera 12, a means for turning over 18 the potatoes P. The turning means 18 comprises for example a succession of rollers 20 forming a plane inclined towards the portion in the field of the camera 12, and rotating in the opposite direction. The turning means 18 thus allows turning over the potatoes P on themselves in order to expose the different parts thereof to the camera 12 for analysis.

The images recorded by the camera 12 are then transmitted to analysis means configured to categorize the potatoes P according to different criteria, in particular aesthetic criteria based on the appearance, size, shape and/or color of the potatoes P. Thus, the images recorded by the camera 12 are transmitted to the image processing unit 8. The image processing unit 8 is configured to identify the different potatoes P in the bulk flow conveyed by conveying unit 2, and to analyze the visual appearance of said potatoes P.

To this end, the processing unit 8 can comprise a convolutional neural network, that is to say a network of neurons, allowing the analysis of the potatoes P based on the criteria determined during a preliminary learning phase. In other words, the processing unit 8 has "learned", during a preliminary learning phase during which different potatoes were presented to the processing unit 8 with the criteria corresponding thereto, in order to allow the processing unit 8 to be able to assign the same criteria to identical or similar potatoes.

Even if the preliminary learning phase can be tedious, the use of a convolutional neural network allows great freedom and a wide choice of criteria to categorize the agricultural products. The sorting device 1 can thus adapt to a change in the sorting criteria.

Finally, in order to assign to the same agricultural product P the different views recorded by the image acquisition unit 6 during the phase of turning over the agricultural product P by the turning means 18, the processing unit 8 can also be configured to monitor, optionally in real time, each agricultural product P on the conveying unit 2. In other words, the processing unit 8 is also capable of identifying the different agricultural products P in the bulk flow and of monitoring them during their turning over and/or conveying through the conveying unit 2.

The processing unit 8 then outputs a signal representative of the visual appearance of the potatoes P to the decision unit 10. The decision unit 10 allows deciding, according to the visual appearance provided by the processing unit and as a function of determined quantities or thresholds, in which category to direct the agricultural products, that is to say deciding towards which outlets 2*b*, 2*c* or 2*d* to direct the agricultural products. The decision unit 10 then outputs a control signal to the separation unit 4 corresponding to the category of the agricultural products P arriving at the level of the separation unit 4.

The separation unit 4 is configured to modify the path of the agricultural products P in order to direct them towards one of the outlets 2*b*, 2*c* or 2*d* of the conveying unit 2. To this end, the separation unit 4 includes a plurality of fingers 22 distributed over the width of the conveying unit 2 and configured either to let the agricultural product P pass or to deflect the agricultural product P towards one or several outlets of the conveying unit 2. The fingers 22 each include a retracted position in which they do not come into contact with the agricultural product P, and a deployed position in which they intersect the path of the agricultural products P. Thus, it is possible to sort the agricultural products P into two categories by deflecting or not their path with the fingers 22 of the separation unit 4. In the case illustrated in FIG. 1, the separation unit 4 is thus configured either to let the agricultural products P pass, for example the agricultural products P having the desired visual appearance, towards the outlet 2*d* by controlling the fingers 22 in a retracted position, or to deflect the agricultural products P, for example the agricultural products P unfit for consumption or the foreign bodies such as clods of earth or stones, towards the outlet 2*c* by controlling the fingers 22 in a deployed position.

Furthermore, in order to be able to perform a sorting into at least three categories, the fingers 22 are also configured to deflect, in the deployed position, the agricultural products P with or without impetus. More specifically, the separation unit 4 is configured to allow deploying the fingers 22 before the passage of the agricultural product P or during the passage of the agricultural product P. Thus, by deploying the finger 22 when the agricultural product P is in front of it, the separation unit 4 is capable of giving an impetus to said agricultural product P, that is to say to "hit" it, in order to make it move towards the outlet 2*b*. The separation unit 4 is thus configured either to deflect the agricultural products P, for example the agricultural products P unfit for consumption or the foreign bodies such as clods of earth or stones, towards the outlet 2*c* by controlling the fingers 22 in a deployed position before the passage of the agricultural product P in front of the separation unit 4, or to deflect the agricultural products P, for example the agricultural products P that do not have the desired visual appearance, towards the outlet 2*b* by controlling the fingers 22 in a deployed position during the passage of the agricultural product P in front of the separation unit 4 in order to launch it beyond the outlet 2*c*.

The separation unit 4 thus allows sorting the agricultural products P, using fingers 22 similar to those used currently, into three categories thanks to the control of the triggering of the deployment of the fingers 22 in order to deflect the agricultural products P with or without impetus.

However, in order to be able to process the images recorded by the acquisition unit 6 and decide on the sorting to be performed by the separation unit 4, a time delay is necessary between the acquisition of the images and the separation made by the fingers 22. Thus, the conveying unit 2 can comprise an intermediate portion 24 located between the turning means 18 and the separation unit 4. The intermediate portion 24 aims to leave time for the image processing 8 and decision 10 units before the agricultural products P arrive at the separation unit 4. In order to ensure that the relative position of the agricultural products P in the conveying unit 2 is not modified at the level of the intermediate portion 24, the latter can be configured to maintain said relative position of the agricultural products P when they are conveyed through the intermediate portion 24.

Alternatively, the intermediate portion 24 can be mounted in the field of the image acquisition unit 6. In this case, the agricultural products P conveyed through the intermediate portion 24 remain in the field of view of the image acquisition unit 6 and can therefore be monitored, optionally in real time, by the processing unit 8 until they are conveyed to the separation unit 4, so as to allow the decision unit 10 and the separation unit 4 to know exactly when each agricultural product P will pass in front of the separation unit 4.

FIG. 2 illustrates the different successive steps of implementation of the sorting method 26 by the sorting device illustrated in FIG. 1.

Thus, in a first step 28, a bulk flow of agricultural products P to be sorted is provided.

Then, in a second step 30, images of said bulk flow are recorded while said agricultural products P are turned over. Such a step then allows having a view of the different sides of the agricultural products of the bulk flow.

In a third step 32, each product is identified and analyzed in said bulk flow, and each agricultural product is monitored in real time in said bulk flow.

In a step 34, the products to be separated are then determined, optionally during the monitoring of the agricultural products in real time.

Finally, in a step 36, the agricultural products determined during the step 34 are separated.

Thus, thanks to the sorting device according to the disclosure, it becomes possible to sort agricultural products according to different visual criteria which will have been learned by the processing unit, and according to thresholds which will have been indicated to the decision unit. Such a device can thus replace human intervention during the sorting step, and allow increasing the sorting speed while maintaining a reliable or, where appropriate, an adjustable result according to the user's wishes. In addition, such a device also allows sorting the products into more than two categories, while keeping a finger separation unit, thanks to the timing of triggering of said fingers, which allows deflecting the agricultural product towards a first outlet, or hitting it towards a second outlet. The sorting device thus offers a wide choice of options and adaptations to the user for the analysis and sorting of the agricultural products.

The invention claimed is:

1. A sorting device configured to sort agricultural products coming from a bulk flow, comprising:

- an image acquisition unit configured to record images of said bulk flow,
- image processing and decision units receiving as inputs the images recorded by said image acquisition unit, said image processing and decision units being configured to identify each product and analyze the products in said bulk flow from said recorded images, and configured to determine, from the visual appearance of the products, the products to be separated and to provide a corresponding control signal,
- a separation unit receiving as input the control signal and arranged to separate at least some of said products coming from the bulk flow according to the control signal, and
- a conveying unit configured to convey the agricultural products in the form of bulk flow, from the image acquisition unit to the separation unit,
- wherein the sorting device also comprises a turning device configured to turn over the agricultural products on themselves, mounted in the conveying unit facing the image acquisition unit, and configured to allow an exposure to the image acquisition unit, of the different parts of the conveyed agricultural products,
- wherein the separation unit comprises a single row of fingers, each of the fingers in the row having a deployed position to deflect a path of at least a portion of the agricultural products, and a retracted position to allow a passage of at least a portion of the agricultural products,
- wherein the separation unit is also configured to:
  - position one or more fingers in the single row of fingers in the retracted position to sort the agricultural product into a first category,
  - to position at least one of the fingers in the single row of fingers from the retracted position to the deployed position before the passage of the agricultural product facing the at least one of the fingers, so as to deflect the path of the agricultural product without impetus,
  - to sort the agricultural product into a second category, and
  - to position at least one of the one or more fingers in the single row of fingers from the retracted position to the deployed position during passage of the agricultural product facing the at least one of the fingers so as to deflect the path of the agricultural product with impetus to sort the agricultural product into a third category.

2. The sorting device according to claim 1, wherein the image processing and decision units are further configured to monitor each product on the conveying unit, in said bulk flow, including during its turning over on the turning device.

3. The sorting device according to claim 2, wherein the image processing and decision units are configured to monitor in real time, each product on the conveying unit, in the bulk flow, including during its turning over on the turning device.

4. The sorting device according to claim 3, wherein the image acquisition unit further comprises a casing covering the at least one camera, the at least one light source, and the portion of the conveying unit.

5. The sorting device according to claim 1, wherein the conveying unit also comprises an intermediate portion disposed downstream of the turning device configured to convey the agricultural products to the separation unit.

6. The sorting device according to claim 5, wherein the intermediate portion is configured to maintain the relative position of the agricultural products in the bulk flow during their conveying through the intermediate portion to the separation unit.

7. The sorting device according to claim 5, wherein the intermediate portion is also positioned facing the acquisition unit.

8. The sorting device according to claim 1, wherein the acquisition unit comprises at least one camera.

9. The sorting device according to claim 8, wherein the image acquisition unit further comprises at least one light source, mounted above a portion of the conveying unit.

10. The sorting device according to claim 9, wherein the at least one light source is mounted in line with a portion of the conveying unit.

11. The sorting device according to claim 1, wherein the acquisition unit is configured to record several images per second.

12. The sorting device according to claim 1, wherein the image processing and decision units comprise a convolutional neural network.

13. The sorting device according to claim 1, wherein the agricultural products are chosen among potatoes, carrots or onions.

14. The sorting device according to claim 1, wherein the image processing and decision units are configured to analyze a visual appearance of the products.

15. The sorting device according to claim 1, wherein the fingers of the separation unit are uniformly distributed over a width of the conveying unit.

16. A sorting method for sorting agricultural products coming from a bulk flow, comprising:

- performing image acquisition by recording images of the bulk flow;
- performing an image processing by receiving as inputs the recorded images, and identifying and analyzing each product in the bulk flow;
- determining, from a visual appearance of the products, the products to be separated;
- performing a separation by separating at least some the products coming from the bulk flow using a separation unit comprising a single row of fingers;
- conveying the products in the form of bulk flow from the image acquisition to the separation; and turning over the agricultural products on themselves, during the image acquisition, to allow an exposure of the different parts of the agricultural products, wherein, during the separation step, the path of some of the products is not deflected to sort them into a first category, the path of some of the products is deflected without impetus to sort them into a second category, and the path of some of the products is deflected with impetus to sort them into a third category.

17. The sorting method according to claim 16, wherein, while maintaining the relative position of the agricultural products in the bulk flow, the agricultural products are conveyed from a turning device to a separation unit that performs the separation of the products.

18. The sorting method according to claim 16, wherein during the image processing step, the visual appearance of each product is analyzed.

19. A sorting device configured to sort agricultural products coming from a bulk flow, comprising:

processing circuitry configured to receive images recorded by an imaging device, identify the agricultural products, analyze the agricultural products in the bulk flow from the recorded images, determine, from a visual appearance of the agricultural products, the products to be separated, and provide a corresponding control signal based on the products to be separated as determined;

a separation unit receiving, as input, the corresponding control signal and adapted to separate at least some of the agricultural products coming from the bulk flow according to the corresponding control signal;

a conveying unit configured to convey the agricultural products in the form of the bulk flow to the separation unit, a turning device configured to turn over the agricultural products on themselves, mounted in the conveying unit, and configured to allow an exposure to the imaging device, of the different parts of the agricultural products as conveyed;

wherein the separation unit comprises only one row of fingers, each of the fingers having a deployed position to deflect a path of an agricultural product, and a retracted position to allow a passage of the agricultural products, wherein the separation unit is also configured to position one or several of the fingers of said row of fingers in the retracted position to sort an agricultural product into a first category, to position the one or several fingers of said row of fingers from the retracted position to the deployed position before the passage of the agricultural product facing said fingers, so as to deflect a path of the agricultural product without impetus, to sort the agricultural product into a second category, and to position at least one of the fingers of said row of fingers from the retracted position to the deployed position during the passage of an agricultural product facing the at least one of the fingers, so as to deflect a path of the agricultural product with impetus, to sort the agricultural product into a third category.

20. A sorting device configured to sort agricultural products coming from a bulk flow, comprising:

an image acquisition unit configured to record images of said bulk flow, image processing and decision units receiving as inputs the images recorded by said image acquisition unit, said image processing and decision units being configured to identify each product and analyze the products in said bulk flow from said recorded images, and configured to determine, from a visual appearance of the products, the products to be separated and to provide a corresponding control signal, a separation unit receiving as input the control signal and arranged to separate at least some of said products coming from the bulk flow according to the control signal, and a conveying unit configured to convey the agricultural products in the form of bulk flow, from the image acquisition unit to the separation unit, wherein the sorting device also comprises a turning device configured to turn over the agricultural products on themselves, mounted in the conveying unit facing the image acquisition unit, and configured to allow an exposure to the image acquisition unit, of the different parts of the conveyed agricultural products, wherein the conveying unit also comprises an intermediate portion disposed downstream of the turning device and different from the turning device, and conveying the agricultural products to the separation unit, wherein the intermediate portion is also positioned facing the image acquisition unit, and wherein the image processing and decision units are also configured to monitor each product in the bulk flow on the intermediate portion in real time.

* * * * *